United States Patent
König et al.

[11] 3,872,074
[45] Mar. 18, 1975

[54] METHOD FOR THE AMINOLYSIS OF ACTIVATED ESTERS IN THE PRESENCE OF N-HYDROXY COMPOUNDS AS CATALYSTS

[75] Inventors: Wolfgang König, Langenhaim/Taunus; Rolf Geiger, Frankfurt/Main; Hans Wissmann, Bad Soden/Taunus, all of Germany

[73] Assignee: Farbwerke Hoechst Aktiengesellschaft, Frankfurt/Main, Germany

[22] Filed: June 20, 1972

[21] Appl. No.: 264,441

[30] Foreign Application Priority Data
Jan. 20, 1972  Germany.............................. 2202613

[52] U.S. Cl. ............................................. 260/112.5
[51] Int. Cl. ...................... C07c 103/52, C07g 7/00
[58] Field of Search ................................. 260/112.5

[56] References Cited
FOREIGN PATENTS OR APPLICATIONS
1,917,690  10/1970  Germany ......................... 260/112.5

OTHER PUBLICATIONS
König et al., Chem. Ber., 103, 788–798 (1970).
König et al., Chem. Ber., 103, 2034–2040 (1970).
Merrifield, Adv. in Enzymology, 32, 252 (1969).

*Primary Examiner*—Lewis Gotts
*Assistant Examiner*—Reginald J. Suyat
*Attorney, Agent, or Firm*—Curtis, Morris & Safford

[57] ABSTRACT

A process for the manufacture of peptides by reacting a protected amino acid or a protected peptide ester with an optionally protected amino acid or a peptide having a free amino group, which may be bound to a polymer support, by adding a heterocyclic compound of the formula

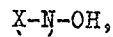

wherein X stands for the groups C=O, C=S or –N= and X and N are members of a 5- or 6-membered heterocyclic ring optionally substituted and fused with a benzene nucleus and/or optionally containing 1 or 2 further hetero atoms, and the pK-value whereof lies between 3.7 and 4.2, as catalysts for the condensation.

2 Claims, No Drawings

METHOD FOR THE AMINOLYSIS OF ACTIVATED ESTERS IN THE PRESENCE OF N-HYDROXY COMPOUNDS AS CATALYSTS

The present invention relates to a process for the manufacture of peptides.

In many cases, peptides are prepared with a good yield, using strongly activated esters of N-acylamino acids, for example N-hydroxy-succinimide esters [cf. J. Am. Chem. Soc. 86 1839 (1964)], 1-hydroxy-benzotriazole esters [cf. Chem. Ber. 103, 788 (1970)], or 1-hydroxy-4-oxo-3,4-dihydrobenzotriazine esters [cf. Chem. Ber. 103, 2034 (1970)]. These strongly activated esters, however, cannot always be prepared in crystallized form and with the degree of purity required. Moreover, they are relatively unstable and often cannot be stored for a long time. Better crystallization properties and also a higher stability are inherent in negatively substituted phenyl esters, for example p-nitrophenyl esters (cf. Chem. u. Ind. 1955, page 1517), 2,4,5-trichlorophenyl esters [cf. Helv. Chim. Acta 46, 1609 (1963)], pentachlorophenyl esters [cf. Roczniki Chem. 35, 1533 (1961)], or 2,6-dichloro-4-nitrophenyl esters [cf. Aust. J. Chem. 21, 477 (1968)]. However, these esters have the disadvantage of considerably reducing the reaction rate in the synthesis of sterically hindered peptides, the result being, in many cases, a reaction period of many days. In extreme cases, no peptides are formed at all.

Attempts have already been made for some time to catalyse the esters which are slow to react by means of additives of various types. For example, imidazole [cf. Angew. Chem. 74, 904 (1962); op. cit. 75, 209 (1963)], 2-hydroxy-pyridine, 1,2,4-triazole or pyrazole derivatives [cf. Proc. Chem. Soc. 1963, page 266; Rec. Trav. chim. Pays-Bas 84, 213 (1965)] have been used for the catalysis of esters.

Although said catalysts, except imidazole, caused aminolysis of the activated esters without racemization, the reaction rate could not be increased to such an extent that peptides, which are heavily sterically hindered, are also formed smoothly.

Hence, these catalysts are weak and their activity is even attained by polar basic solvents, for example dimethylformamide. Accordingly, they do not further accelerate the reaction rate in the solvents which are mostly used for the synthesis of higher peptides.

An improvement was made using the sodium salt of 2-hydroxypyridine for the catalysis (cf. German Offenlegungsschrift No. 2 031 826). After scarcely an hour, good yields are obtained even with sterically hindered peptides. However, the sodium salt of 2-hydroxypyridine has the disadvantage of giving a strongly basic reaction and, possibly, bringing about racemization in the sensitive peptide molecules. In fact, a racemization test by gas chromatography showed that the sodium salt of 2-hydroxy-pyridine has a racemizing effect. It has now been found that aminolysis of activated esters of the phenyl ester type can be extraordinarily accelerated by adding an acid heterocyclic N-hydroxy compound having a pK-value of from 3.7 to 4.2, so that a synthesis of peptides, which would otherwise take a reaction time of many days, is complete within a few minutes.

A comparison of the half-life periods in the synthesis of Z-Val-cyclohexylamide from molar amounts of Z-Val-ONp and cyclo-hexylamine with the addition of the various hydroxy compounds with the pK-values of these compounds demonstrates especially well the catalytic activity of the N-hydroxy compounds as dependent on the pK-value (cf. Table 1, experimental part).

This invention now provides a process for the manufacture of peptides, which comprises reacting a protected amino acid or a protected peptide of the formula II

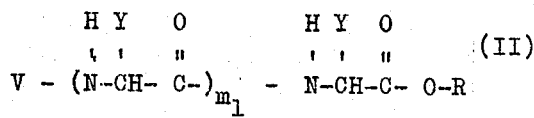

in which V stands for an amino protective group usual in peptide chemistry on the pyroglutamyl radical, Y for a lower alkyl group which may be branched and/or substituted by hydroxy, amino, thio, carboxylic acid, carbamoyl, guanidino, aryl, imidazoyl or indolyl radicals which may be suitably protected, where required, and the group —NH—CHY— may also stand for the pyrrolidinyl radical, R stands for a di-, tri-, tetra- or pentachlorophenyl, nitrophenyl or chloronitrophenyl radical and $m_1$ stands for zero or an integer of from about 1 to 10, while adding a compound of the general formula I

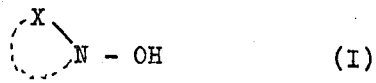

in which X stands for the groups C=O, C=S or —N=, and X and N are members of a 5- to 6-membered, optionally substituted, heterocyclic ring which may be fused with a benzene nucleus and/or which contains 1 or 2 further hetero atoms, and the pK value of which in a 0.5-molar solution in a mixture of 6 parts of diethylene-glycol dimethyl ether and 4 parts of water at 30°C is between 3.7 and 4.2, with an amino acid or a peptide which may be protected and which corresponds to the general formula III

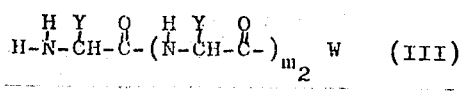

in which Y and the —NH—CHY— radical are defined as above, and $m_2$ stands for zero or integers on the order of magnitude of 1 to 500, and W stands for a hydroxy, O-alkyl, O-aralkyl or amino group which may be substituted by alkyl, aralkyl or aryl, or for a polymer support linked in ester- or amide-like form and, where required, all, or part of, the protective groups are split off in known manner from the so-obtained protected peptide of the formula IV

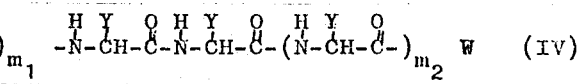 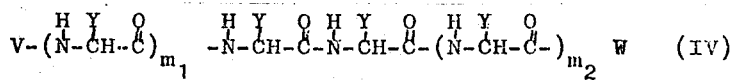

The pK-value of the additives is critical for successfully carrying out the process of the invention. As disclosed in the Experimental Part, it is necessary to measure the pK-value. If, in the system mentioned, the pK-value of the compounds of the formula I is higher (as in the case of N-hydroxy-piperidine) or lower (as in the case of 1-hydroxy-6-nitro-benzotriazole), the catalytic activity is diminished considerably.

Generally, amounts of from 0.1 to about 1 equivalent of N-hydroxy compound are used, but smaller or larger amounts may also be used.

Compounds suitable for catalysis are, inter alia, 1-hydroxy-benzotriazoles, for example 1-hydroxy-5,6-dimethylbenzotriazole, 1-hydroxy-5-methyl-benzotriazole, 1-hydroxy-6-methyl-benzotriazole, 1-hydroxy-5-methoxy-benzotriazole, 1-hydroxy-4-methyl-benzotriazole, 1-hydroxy-6-bromo-benzotriazole, 1-hydroxy-6-chloro-benzotriazole, 1-hydroxy-5-chloro-benzotriazole; cyclic hydroxamic acids, for example pyridones, such as 1-hydroxy-2-pyridone, 1-hydroxy-4-methyl-2-pyridone (cf. U.S. Pat. No. 2 540 218), 1-hydroxy-4,6-dimethyl-2-pyridone, 1-hydroxy-3,4,6-trimethyl-2-pyridone, (cf. Belgian patent No. 738 288), 1-hydroxy-3,5-dichloro-4,6-dimethyl-2-pyridone, N-hydroxy-succinimide or 1-hydroxy-2-oxo-2,3-dihydro-indoles, such as 1-hydroxy-6-chloro-2-oxo-2,3-dihydro-indole [cf. J. Am. Chem. Soc. 78, 222 (1956)]; cyclic hydroxamic acids containing a nitrogen atom as a hetero atom in the ring, for example 3-hydroxy-4-oxo-3,4-dihydro-quinazoline, 3-hydroxy-2-methyl-4-oxo-3,4-dihydro-quinazoline, 3-hydroxy-4-oxo-3,4-dihydro-1,2,3-benzotriazine, 3-hydroxy-4-oxo-2-phenyl-3,4-dihydro-quinazoline (cf. J. Chem. Soc. 1960, pages 2157 – 2160); cyclic hydroxamic acids having an oxygen or sulfur atom as a hetero atom in the ring, for example suitably substituted 4-hydroxy-3,4-dihydro-3-oxo-1,4,2-benzoxazines and 4-hydroxy-3,4-dihydro-3-oxo-1,4,2-benzothiazines; or cyclic thiohydroxamic acids, for example 3-hydroxy-4-methyl-2,3-dihydro-thiazole-2-thione.

As substituents of the compounds of the formula I, there may be mentioned alkyl or alkoxy groups having 1 or 2 carbon atoms, and halogen atoms, especially chlorine.

The amino component of the formula III may either be employed in a free form or as a salt with mineral acids or strong or weak organic acids, for example of p-toluene-sulfonic acid, trifluoro-acetic acid or acetic acid. If a salt is formed with a strong acid, the amino group must be set free by adding a tertiary organic base, such as triethylamine or N-ethyl-morpholine. It is also possible to add a salt of these N-hydroxy compounds, such as the sodium salt of 1-hydroxy-benzotriazole. In this case, the amino group is set free (formation of the sodium salt) at the same time that the 1-hydroxy-compound of the formula I, necessary for the catalysis, is formed.

As protective groups V, the N-protective groups usual in peptide chemistry (cf. Schroder-Lubke, The Peptides, New York and London 1965/66), preferably aralkyloxy-carbonyl groups, such as benzyloxy-carbonyl, or tert.-alkyloxy-carbonyl groups, such as tert.-butyloxy-carbonyl are used.

The OH-function in serine, threonine or tyrosine may be left unprotected. It may, however, also be protected by suitable groups, for example by tert.-butyl or benzyl groups.

For the manufacture of cysteine and cystine peptides, the SH-function of cysteine has to be protected by the SH-protective groups usual in peptide chemistry, or the reaction is carried out on symmetrical or unsymmetrical cystine peptides which can then be reduced, where required, to cysteine peptides.

The symbol W in the carboxyl component of the formula III stands also for a polymer support which is linked to the carboxyl group like an ester or an amide. Suitable polymers are polystyrene cross-linked with 1 to 2% of divinyl-benzene, cross-linked condensation products of phenol and formaldehyde, cross-linked condensation products of phenol ether and formaldehyde, plastics structures coated with chemically linked polystyrene, polybenzyl resins or phenyl-substituted glass structures. Suitable linking groups are, for example, halogeno-methyl, halogeno-acetyl or amino-benzhydryl groups.

Condensation is advantageously performed in solvents, for example dimethylformamide, dimethylacetamide, tetramethyl-urea or phosphoric acid-tris-dimethylamide, optionally with an addition of a small amount of water. The reaction temperature is advantageously between 0° and 40°C, preferably room temperature.

The work-up is simple since the N-hydroxy compounds of the general formula I, such as 1-hydroxy-benzotriazole or 3-hydroxy-4-oxo-3,4-dihydro-quinazoline, can be entirely removed by shaking them with sodium or potassium bicarbonate or a sodium carbonate solution. Other compounds used according to the invention, for example 1-hydroxy-2-pyridone or 3-hydroxy-4-methyl-2,3-dihydro-thiazole-2-thione, are soluble in water and can therefore be removed very easily. The N-hydroxy compounds can also be extracted from sparingly soluble peptide derivatives using isopropanol, alcohol, methanol, tetrahydrofuran or hot water. The phenols formed during the reaction have solution properties similar to those of N-hydroxy compounds and are generally removed together with them.

Further purification is performed in usual manner: in the case of lower peptides, for example, by distributing them between an organic and an aqueous phase; by dissolving and precipitating them or recrystallizing them from a suitable solvent; or by subjecting them to chromatography, for example on "Sephadex LH–20" (Registered Trademark) (cross-linked, partially etherified dextran gel), in an organic solvent or an organic-aqueous mixture of solvents; or optionally also by subjecting them to distribution chromatography in only partially miscible solvent components.

In the case of higher peptides or proteins, it may be advantageous to purify them only after the protective groups have been split off, for example by means of equipotential precipitation, crystallization, counter-current distribution, distribution chromatography, gel chromatography or preparative electrophoresis.

How to split off the protective groups depends on the nature of these groups and has to take into consideration the stability of the reaction products of the formula III or of the peptides on which these compounds are based. The methods for splitting off the groups are known in peptide chemistry (cf. Schroder-Lubke, loc. cit.).

The addition of N-hydroxy compounds of the formula I does not increase racemization in N-acyl peptide active esters, as is shown by the racemization test known from Chem. Ber. 103, 788 (1970) (cf. Table 2 in the Experimental Part). In this racemization test, no racemization could be observed either with nitrophenyl esters or with trichlorophenyl esters with or without the addition of N-hydroxy compounds. In contradistinction thereto, pentachlorophenyl ester provided a tripeptide which had a racemization degree of up to about 80%. By adding 1-hydroxy-benzotriazole, this high degree of racemization could be reduced by 26 to 54%. When the sodium salt of 2-hydroxy-pyridine was added, the inverse effect could be observed as already mentioned: racemization was even intensified.

The addition of the N-hydroxy compounds of the formula I according to the invention helps to overcome steric hindrance, hitherto an unsurmountable obstacle to a number of reactions with activated esters, for example to the reaction of Nps-isoleucine active esters with H-Cys(Trt)-Ser-Leu-OH. The reaction of Nps-Ile-OTcp with H-Cys(Trt)-Ser-Leu-OH in dimethylformamide could not be completed. After 5 weeks, the reaction was discontinued since, in addition to some end product and starting material, several decomposition products could already be established by thin-layer chromatography. When, however, for examaple 1-hydroxy-benzotriazole, 3-hydroxy-4-oxo-3,4-di-hydroquinazoline or 1-hydroxy-2-pyridine was added, the reaction was already complete after 15 to 20 hours (cf. Table 3, Exper. Part).

The enormous catalytic power of these N-hydroxy compounds can also be exploited in the solid-state peptide condensation method. For example, according to J. Am. Chem. Soc. 90, 2953 (1966) corresponding insoluble esters can be prepared from N-protected amino acids and a poly-4-hydroxy-3-nitro-styrene resin and can then be reacted with soluble amino compounds to yield the corresponding amides or peptides. When the N-hydroxy compounds of the invention are employed, the reaction time can be shortened considerably. Also in the modified Merrifield-Solid State method, accordingg to which N-protected amino acid active esters, for example nitrophenyl ester, are often used, the additives of the invention increase the yield and shorten the reaction time.

It is just the increase in yield which is critical in the solid-state method for the success of such a synthesis. The synthesis of a pentapeptide having a heavy steric hindrance and belonging to the sequence of the insulin A chain demonstrates the advantage of the additives of the invention (cf. Example 16). This is the first time that a method has been found according to which the steric hindrance, especially pronounced in the solid-state synthesis, can be overcome.

The novel process is advantageous not only for minor peptides. Major peptides, such as $N^{(A1)}$, $N^{(B29)}$-bis-Boc-insulin [cf. Hoppe-Seyler's Z. physiol. Chem. 352, 7 (1971)], a complicated peptide synthesized from 51 amino acids, can be smoothly reacted, within a few minutes, with N-acylamino acid active esters and N-acyl peptide active esters to yield the corresponding $N^{(B1)}$-N-acyl-amino acid or $N^{(B1)}$-N-acyl peptide-$N^{(A1)}$, $N^{(B29)}$-bis-Boc-insulins.

Compounds of the formula III may also be proteins, the free amino groups of which react, in whole or in part, with the compounds of formula II. Under extremely unfavorable solubility conditions, for example aqueous dimethylformamide proves to be very suitable. Appropriate proteins are, for example, gelatine which can be partially degradated, serum albumin or casein.

After the protective groups have been split off, the reaction products, for example those obtained from compounds of the formula II with $N^{(A1)}$, $N^{(B29)}$-bis-Boc-insulin, have a high biological activity and modified physical and chemical as well as immunological properties which are advantageous for the manufacture of novel insulin preparations. Reaction products of compounds of the general formula II with proteins may be employed, where required after splitting-off of the protective groups, for the production of antigens against the amino acids or peptides of formula II from which these compounds are derived.

The peptides to be prepared according to the process of the invention are synthesized from all amino acids to be found in naturally occurring peptides in their L- or D-form. It is also possible to use β-amino acids, for example β-alanine, or other synthetic or semi-synthetic amino acids, for example α-methyl-alanine, α-methyl-3,4-dioxy-L-phenyl-alanine or β-chloro-alanine.

The process of the invention is particularly advantageous since the long reaction periods, which were hitherto required in many cases, are now reduced to a few minutes. This is a special advantage, for example, for the nitrophenyl ester method which is one of the most frequently applied condensation methods for peptides.

Especially in the production of peptides on an industrial scale, the process of the invention means good progress since the throughput per unit of time can be increased considerably.

Another special advantage of the process of the invention is that the catalytic effect of the N-hydroxy compounds of the invention is fully developed especially in the above-cited strongly polar solvents, which are the only ones used for the synthesis of higher peptides because of their good dissolving properties.

After the protective groups have been split off, the peptides prepared according to the invention can be used as therapeutic compositions or as intermediate products for the manufacture of other therapeutically interesting peptides, for example oxytocin, vasopressin, glucagon, secretin, ACTH, thyrocalciton, gastrin TRH, $LR^H$ or insulin.

The amino acids mentioned in the Disclosure and Examples are abbreviated according to international rules. In addition, the following abbreviations are used:

| | |
|---|---|
| Boc | tert.-butyloxy-carbonyl |
| Z | benzyloxy-carbonyl |
| Nps | o-nitrophenyl-sulfenyl |
| OBu$^t$ | tert.-butyl ester |
| OMe | methyl ester |
| OBzl | benzyl ester |
| ONp | p-nitro-phenyl ester |
| OTcp | 2,4,5-trichlorophenyl ester |
| OPcp | pentachloro-phenyl ester |
| OSu | N-hydroxy-succinimide ester |
| Trt | trityl |
| Bu$^t$ | tert.-butyl |
| Mbh | 4,4'-dimethoxy-benzhydryl |
| CHA | cyclohexylamine |

The following Examples serve to illustrate the invention.

EXAMPLE 1

Establishing the half-life period in the synthesis of Z-Val-cyclohexyl amide from equimolar amounts of Z-Val-ONp and cyclo-hexyl amine with an addition of various N-hydroxy-compounds, and the dependency of the half-life period on the pK-value of the N-hydroxy compounds.

a. Definition of the half-life period

Solution I: 0.5 μ mol of cyclohexylamine, 0.5 μ mol of p-nitro-phenol and 1.0 μ mol of N-hydroxy compound per ml of dimethylformamide.

Solution II: 1.0 μ mol of p-nitrophenol per ml of dimethylformamide.

Solution III: 1.0 μ mol of N-hydroxy compound per ml of dimethylformamide.

The UV-curves (range: 330–300 nanometers) of the solutions I, II and III were compared with each other in order to find a wave length which is favorable for measuring p-nitrophenol. At this wave length, the extinction is measured. 50% of the extinction of a solution of 1 nmol of Z-Val-ONp and 1 nmol of triethylamine per ml of solvent were added to the value obtained for solution I at the wave length chosen above. The sum of these two extinctions represents the extinction at which half the amount of Z-Val-ONp has reacted with cyclohexylamine.

The UV-curves were measured by means of a "Beckmann TK 1A" apparatus at 21°C. The substances were dissolved in dimethylformamide.

b. Measuring of the half-life period

For the kinetic measurement of the half-life period $t$ ½, a solution of 1 μ mol of Z-Val-ONp, 1 μ mol of cyclohexylamine and 1 μ mol of N-hydroxy compound per ml of solvent was measured at the wave length defined sub (a). The period during which the extinction percentage defined sub (a) was reached corresponds to the half-time period of the reaction.

c. Measuring of the pK-values in a 0.5-molar solution (diethylene-glycol dimethyl ether/water at a ratio of 6 : 4) at 30°C.

0.5 mmol of substance was dissolved in a mixture of 6 ml of diethylene-glycol dimethyl ether, 2.5 ml of 0.1N NaOH and 1.5 ml of water and the solution was heated to 30°C in a thermostat. The pH was measured potentiometrically by means of a single-rod glass electrode. According to the approximation formula $pH - pK = \log \alpha/1-\alpha$, where $\alpha$ is concentration, $pK \cong pH$ for $\alpha = 0.5$. Hence, the above-measured pH-value is the pK-value of this compound.

d. Table 1:

Comparison of the half-life periods in the synthesis of Z-Val-cyclohexyl amide from molar amounts of Z-Val-ONp and cyclohexylamine with the pH-values of the N-hydroxy compounds added.

EXAMPLE 2

Racemization test by gas chromatography according to F. Weygand et al. [cf. Chem. Ber. 99, 1451 – 1460 (1966); op. cit. 103, 788 – 798 (1970)].

I. PREPARATION OF THE STARTING PRODUCTS (a) HBr.H—Phe—ONp 4.2 g of Z—Phe—ONp were suspended in 10 ml of glacial acetic acid. 10 ml of saturated HBr/glaciaal acetic acid were added and the mixture was stirred for 1 hour at room temperature. Subsequently, the hydrobromide was precipitated with a large amount of ether and the precipitate was thoroughly washed with ether.

Yield: 3.5 g, melting point: 216°–219°C.

b. HBr.H—Phe—OPcp 5.47 g of Z-Phe-OPcp were treated as sub I(a).

Yield: 4.1 g, m.p. 205°C with decomposition.

c. HBr.H—Phe—OTcp 4.78 g of Z-Phe-OTcp were treated as sub I(a).

Yield: 4.2 g, m.p. 220°C with decomposition.

d. Boc—Leu—Phe—ONp 2.49 g of Boc—Leu—OH.1 H$_2$O were dissolved in ethyl acetate. The ethyl acetate was dried with sodium sulfate, concentrated and the residue was dried under greatly reduced pressure. The residue was dissolved in 20 ml of absolute tetrahydrofuran and the solution was cooled to −10°C. While stirring and cooling with ice, 1.2 ml of N-ethyl-morpholine and then a solution of 1.27 g of isobutyl-chloroformiate in a small amount of cold tetrahydrofuran were added dropwise. Stirring was continued for 10 minutes at −10°C, then 3.35 g of HBr.H—Phe—ONp were added and then a solution of 1.2 ml of N-ethyl-morpholine in 5 ml of tetrahydrofuran was slowly added dropwise. Stirring was continued for 1 hour at 0°C and for another hour at room temperature, the precipitate was suction-filtered, the filtrate was concentrated and the residue was triturated with isopropanol. Yield: 3.77 g, m.p. 150–152°C. After recrystallization from isopropanol:

Yield: 3.10 g, m.p. 152°–153°C; $[\alpha]_D = -32.2°$ ($c = 1$, in dimethylacetamide).

e. Boc—Leu—Phe—OPcp

| Compound | pK | t ½(min) |
|---|---|---|
| without additive | — | 112.0 |
| N-hydroxypiperidine | 5.9 | 125.0 |
| 1-hydroxy-4-methyl-6-isopropyl-2-pyridone | 4.14 | 19.0 |
| 3-hydroxy-2-methyl-4-oxo-3,4-dihydro-quinazoline | 4.11 | 1.9 |
| 3-hydroxy-4-oxo-3,4-dihydro-quinazoline | 4.10 | about 0.25 |
| 1-hydroxy-3,4,6-trimethyl-2-pyridine | 4.09 | 14.8 |
| 1-hydroxy-4,6-dimethyl-2-pyridone | 4.09 | 5.9 |
| 1-hydroxy-4-methyl-2-pyridone | 4.08 | 3.2 |
| 1-hydroxy-2-pyridone | 4.08 | 1.3 |
| 3-hydroxy-4-methyl-2,3-dihydro-thiazole-2-thione | 4.08 | 1.5 |
| 1-hydroxy-3,5-dichloro-4,6-dimethyl-2-pyridone | 4.05 | 4.0 |
| 1-hydroxy-2-oxo-2,3-dihydro-6-chloro-indole | 4.05 | 1.5 |
| acetic acid (for comparison) | 4.05 | 60.0 |
| N-hydroxysuccinimide | 4.04 | 4.8 |
| 1-hydroxy-5,6-dimethyl-benzotriazole | 4.02 | 2.1 |
| 1-hydroxy-5-methyl-benzotriazole | 4.02 | 2.8 |
| 1-hydroxy-6-methoxy-benzotriazole | 4.00 | 2.0 |
| 1-hydroxy-5-methoxy-benzotriazole | 4.00 | 3.6 |
| 1-hydroxy-4-methyl-benzotriazole | 4.00 | 3.0 |
| 1-hydroxy-benzotriazole | 4.00 | 3.5 |
| 3-hydroxy-4-oxo-3,4-dihydro-1,2,3-benzotriazine | 4.00 | 18.0 |
| 1-hydroxy-6-bromo-benzotriazole | 3.91 | 8.9 |
| 1-hydroxy-6-chloro-benzotriazole | 3.90 | 10.6 |
| 1-hydroxy-5-chloro-benzotriazole | 3.89 | 13.9 |
| 1-hydroxy-6-trifluoromethyl-benzotriazole | 3.72 | 39.0 |
| 1-hydroxy-5,6-dichloro-benzotriazole | 3.7 | 35.0 |
| 1-hydroxy-6-nitro-benzotriazole | 3.51 | very slow |

According to I (d), the mixed anhydried was prepared from 1.97 g of Boc—Leu—OH. 1 H₂O, 0.93 ml of N-ethyl-morpholine and 1.0 g of isobutyl chloroformiate and reacted with 3.55 g of HBr.H—Phe—OPcp and 0.93 ml of N-ethyl-morpholine. Yield: 3.35 g, m.p. 145°–147°C. After recrystallization from isopropanol: Yield: 2.11 g, m.p. 163°–164°C; $[\alpha]_D = -29.1°$ ($c = 1$, in dimethyl-acetamide).

f. Boc—Leu—Phe—OTcp

According to I (d), a mixed anhydride was prepared from 2.3 g of Boc—Leu—OH.1 H₂O, 1.1 ml of N-ethyl-morpholine and 1.17 g of isobutyl chloroformiate and reacted with 3.6 g of HBr.H-Phe-OTcp and 1.1 ml of N-ethyl-morpholine. Yield: 3.7 g, m.p. 143°–145°C. After recrystallization from isopropanol: Yield: 3.2 g, m.p. 150° – 151°C; $[\alpha]_D = -48.4°$ ($c = 1$, in dimethylacetamide).

II. General Instruction for the preparation of Boc—Leu—Phe—Val—OBuᵗ from Boc-Leu-Phe active esters A catalyzing additive (sodium salt of 1-hydroxybenzotriazole or 2-hydroxy-pyridine) and 0.5 mmol of the corresponding Boc-Leu-Phe active ester (250 mg of Boc—Leu—Phe—ONp, 313 mg of Boc-Leu-Phe-OPcp, 279 mg of Boc-Leu-Phe-OTcp) are added to a solution of 105 mg (0.5 mmol) of HCl.H-Val-OBuᵗ in 2.5 ml of 0.2-molar N-ethyl-morpholine/dimethylacetamide solution. The mixture is allowed to stand for the time given in Table 2, diluted with 50 ml of ethyl acetate, the ethyl acetate solution is shaken with NaHCO₃-solution, KHSO₄-solution, NaHCO₃-solution and NaCl-solution, dried with sodium sulfate and concentrated. The residue is subjected, in a manner analogous to Chem. Ber. 103, 788 – 798 (1970) and op. cit. 99, 1451 – 1460 (1966), to partial hydrolysis, to trifluoroacetylation and to gas chromatography. The results of the racemization test by gas chromatography are compiled in Table 2.

III. Table 2

Racemization tests in the synthesis of Boc—Leu—Phe—Val—OBuᵗ from Boc-Leu-Phe- active esters and H—Val—OBuᵗ under the influence of acylating catalysts

EXAMPLE 3

Synthesis of Nps-Ile-Cys(Trt)-Ser-Leu-OH a. Preparation of Nps-Ile-active esters Molar amounts of Nps-isoleucine and trichlorophenol or N-hydroxy-succinimide were reacted at 0°C in ethyl acetate with a slight excess amount of dicyclohexyl-carbodiimide (DCC). The mixture was stirred for 1 hour at 0°C, then for 3 hours at room temperature, the precipitate was suction-filtered and the filtrate was concentrated. The residue was recrystallized from isopropanol.

Nps-Ile-OTcp, m.p. 95° – 97°C
Nps-Ile-OSu, m.p. 105° – 108°C b. Nps-Ile-Cys(Trt)-Ser-Leu-OH 2.9 g (5 mmols) of H-Cys(Trt)-Ser-Leu-OH.H₂O (prepared according to Chem. Ber. 103 (1970), page 2039) and 815 mg (5 mmols) of 1-hydroxy-5,6-dimethyl-benzotriazole were dissolved in 25 ml of dimethylformamide. 2.32 g (5 mmols) of Nps-Ile-OTcp were added and the mixture was allowed to stand for 15 hours at room temperature. (After this time, the starting tripeptide could no longer be established by thin-layer chromatography). Dimethylformamide was distilled off in vacuo and the residue was triturated with sodium bicarbonate solution. The precipitate was suction-filtered and the filtrate was eliminated. The precipitate was dissolved in ethyl acetate and shaken with KHSO₄-solution and water, dried with sodium sulfate and concentrated. The residue was triturated with ether. The product was amorphous. Yield: 3.6 g (82%); $[\alpha]_D^{22}$ −23.5° ($c$=1, in dimethyl-acetamide). Thin-layer chromatographic following of the synthesis of Nps-Ile-Cys(Trt)-Ser-Leu-OH from Nps-Ile-OTcp or Nps-Ile-OSu and H-Cys(Trt)-Ser-Leu-OH in the presence of various N-hydroxy compounds as catalysts 0.2 mmol of the N-hydroxy compound and 111 mg (0.22 mmol) of Nps-Ile-OTcp or 89.2 mg (0.24 mmol) of Nps-Ile-OSu were added to a solution of 116.3 mg (0.2 mmol) of H-Cys(Trt)-Ser-Leu-OH.H₂0 in 2 ml of dimethylformamide. At different intervals of time, a drop of the reaction solution was applied to a thin-layer silica gel plate [Merck, "Kieselgel F 254" (Registered Trademark)]. The solution was eluted with a mixture of methylene chloride and methanol in a ratio of 8 : 2

| Active ester | catalyst | mol-equivalent of catalyst | reaction period | % of D-Phe-L-Val |
|---|---|---|---|---|
| ONp | — | — | 70 hours | <2% |
| ONp | sodium salt of 2-hydroxy-pyridine | 1.0 | 1 hour | 3.7% |
| ONp | 1-hydroxy-benzotriazole | 1.0 | 5 min. | <2% |
| ONp | 1-hydroxy-benzotriazole | 0.1 | 5 min. | <2% |
| OTcp | — | — | 70 hours | <2% |
| OTcp | sodium salt of 2-hydroxy-pyridine | — | 1 hour | <2% |
| OTcp | 1-hydroxy-benzotriazole | 1.0 | 5 min. | <2% |
| OPcp | — | — | 70 hours | 40% |
| OPcp | 2-hydroxy-pyridine | 1.0 | 1 hour | 40% |
| OPcp | 2-hydroxy-benzotriazole | 1.0 | 5 min. | 27% |
| OTcp | 3-hydroxy-4-oxo-3,4-dihydro-quinazoline | 1.0 | 10 min. | <2% |
| OTcp | 3-hydroxy-2-methyl-4-oxo-3,4-dihydro-quinazoline | 1.0 | 10 min. | <2% |
| OTcp | 1-hydroxy-2-pyridone | 1.0 | 10 min. | <2% | and the chromatogram was developed with ninhydrin. The results of this test are compiled in Table 3.

d. Table 3:

Synthesis of Nps-Ile-Cys(Trt)-Ser-Leu-OH from Nps-Ile-OTcp or Nps-Ile-OSu and H-Cys(Trt)-Ser-Leu-OH with the use of various N-hydroxy compounds as catalysts

| Ester | N-hydroxy compound | end of reaction (reaction period) |
| --- | --- | --- |
| OSu | — | discontinued after 5 weeks since reaction not yet complete |
| OSu | 3-hydroxy-4-oxo-3,4-dihydro-quinazoline | do. |
| OTcp | — | do. |
| OTcp | 1-hydroxybenzotriazole | about 15 hours |
| OTcp | 3-hydroxy-4-oxo-3,4-dihydro-quinazoline | about 15 hours |
| OTcp | 3-hydroxy-2-methyl-4-oxo-3,4-dihydro-quinazoline | about 7 days |
| OTcp | 3-hydroxy-4-oxo-2-phenyl-3,4-dihydro-quinazoline | about 7 days |
| OTcp | 1-hydroxy-5,6-dimethyl-benzo-triazole | about 20 hours |
| OTcp | 1-hydroxy-2-pyridone | about 20 hours |
| OTcp | 1-hydroxy-4-methyl-2-pyridone | about 20 hours |
| OTcp | 1-hydroxy-2,4-dimethyl-2-pyridone | about 4 days |

EXAMPLE 4

Systhesis of Z-Phe-Val-OMe a. Using 1 equivalent of 1-hydroxy-benzotriazole and Z-Phe-OPcp 2.75 g (5 mmols) of Z-Phe-OPcp were added to a solution of 0.92 g (5.5 mmols) of HCl.H-Val-OMe, 0.72 ml of N-ethyl-morpholine and 657 mg (5 mmols) of 1-hydroxy-benzotriazole in 10 ml of dimethylformamide. The mixture was stirred for 5 minutes, concentrated under greatly reduced pressure, the residue was distributed between ethyl acetate and 2N sodium carbonate solution, shaken once with $KHSO_4$-solution, three times with 2N sodium carbonate solution and once with water, dried with sodium sulfate, concentrated and the residue was triturated with petroleum ether.

Yield: 2.08 g, m.p. 99° – 104°C. After recrystallization from ethyl acetate/petroleum ether: Yield: 1.7 g (83%), m.p. 112°–114°C.

b. Using 0.1 equivalent of 1-hydroxy-benzotriazole and Z-Phe-OTcp 2.4 g (5 mmols) of Z-Phe-OTcp were added to a solution of 0.92 g (5.5 mmols) of HCl.H-Val-OMe, 0.72 ml of N-ethyl-morpholine and 67.5 mg (0.5 mmol) of 1-hydroxy-benzotriazole in 10 ml of dimethylformamide. The mixture was stirred for 5 minutes and worked up as sub (a). Yield: 1.66 g (81%), m.p. 112°–114°C.

c. Using 1 equivalent of 1-hydroxy-benzotriazole (sodium salt) and Z-Phe-ONp 865 mg (5.5 mmols) of the sodium salt of 1-hydroxy-benzotriazole and 2.1 g (5 mmols) of Z-Phe-ONp were added to a solution of 0.92 g (5.5 mmols) of HCl.H-Val-OMe in 10 ml of di-methylformamide. The mixture was stirred for 5 minutes and worked up as sub (a). Yield: 1.65 g (80%), m.p. 116°C.

EXAMPLE 5

Synthesis of Z-Val-Val-OMe 865 mg (5.5 mmols) of the sodium salt of 1-hydroxy-benzotriazole and 1.87 g (5 mmols) of Z-Val-ONp were added to a solution of 0.92 g (5.5 mmols) of HCl.H-Val-OMe in 10 ml of dimethylformamide. The mixture was stirred for 5 minutes and worked up as in Example 4 (a). Yield: 1.66 g (91%), m.p. 108–110°C.

EXAMPLE 6

Synthesis of Z-Leu-Glu(OBu$^t$)-Asn(Mbh)-Tyr(Bu$^t$)-OH (Sequence of the insulin A chain)

I. Z-Leu-Glu(OBu$^t$)-Asn(Mbh)-Tyr(Bu$^t$)-OH 1.5 g of Z-Leu-OPcp (2.2 mmols) were added to a solution of 1.53 g (2 mmols) of H-Glu(OBu$^t$)-Asn(Mbh)-Tyr(Bu$^t$)-OH and 270 mg of 1-hydroxy-benzotriazole (2mmols) in 5 ml of dimethylformamide. The mixture was allowed to stand for 10 minutes and concentrated under greatly reduced pressure. The residue was triturated with 2N sodium carbonate solution which was then decanted, and the residue was triturated with water. The precipitate was suction-filtered and the filtrate was distributed between a 2.5% $KHSO_4$-solution and ethyl acetate. The ethyl acetate solution was dried and concentrated. The residue was triturated with ether/petroleum ether (1:1) and suction-filtered. Yield: 1.8 g (89%), m.p. 174°–176°C.

This compound was identical, according to the thin-layer chromatogram, with a sample prepared with Z-Leu-OSu in an analogous manner. The reaction period was 24 hours and the yield was 84%.

The same result was obtained using
a. 3-hydroxy-4-oxo-3,4-dihydro-quinazoline,
b. 1-hydroxy-5,6-dimethyl-benzotriazole or
c. 1-hydroxy-pyridone, instead of 1-hydroxy-benzotriazole used above.

II. Preparation of the starting substance H-Glu(OBu$^t$)-Asn(Mbh)-Tyr(Bu$^t$)-OH a. Z-Asn(Mbh)-Tyr(Bu$^t$)-OH 100 g of Z-Asn(Mbh)-Tyr(Bu$^t$)-OMe (0.138 mol) [Chem. Ber. 103, 2041 – 2051 (1970)] were suspended in a mixture of 770 ml of dioxan and 200 ml of water. At 37°C, 138 ml of 1N NaOH were slowly added dropwise (thymolphthalein used as indicator). When the reaction was complete, the solution was acidified with 300 ml of 2N citric acid. The precipitated product was suction-filtered and washed with water. It was dissolved and precipitated from methanol/water. Yield: 88 g (90%), m.p. 212°–213°C, $[\alpha]_D = +7.6°$ ($c = 1$, in dimethylformamide).

b. H-Asn(Mbh)-Tyr(Bu$^t$)-OH

Hydrogen was passed through a solution of 87.5 g (0.123 mol) of Z-Asn(Mbh)-Tyr(Bu$^t$)-OH in glacial acetic acid, to which a small amount of Pd(OH)$_2$./BaSO$_4$-catalyst had been added, until no more carbon dioxide developed. The solution was concentrated and the residue was thoroughly triturated with a saturated sodium acetate solution. The precipitate was suction-filtered, dried over $P_2O_5$ and dissolved and precipitated from tetrahydrofuran petroleum ether. Yield: 63.5 g (90%), m.p. 207°–209°C; $[\alpha]_D = +11.1°$ ($c = 1$, in glacial acetic acid).

c. Z-Glu(OBu$^t$)-Asn(Mbh)-Tyr(Bu$^t$)-OH 47.4 g (0.109 mol) of Z-Glu(OBu$^t$)-OSu were added at room temperature to a solution of 63 g (0.109 mol) of H-Asn(Mbh)-Tyr (Bu$^t$)-OH in 250 ml of dimethylformamide. The mixture was allowed to stand for 20 hours at room temperature. The substance was then precipitated with water, dried over $P_2O_5$ and dissolved and precipitated from ethyl acetate petroleum ether. Yield: 75.5 g (77%), m.p. 166°–170°C, $[\alpha]_D = +1.8°$ ($c = 1$, in dimethylformamide).

d. H-Glu(OBu$^t$)-Asn(Mbh)-Tyr(Bu$^t$)-OH 74.7 g (83.3 mmols) of Z-Glu(OBu$^t$)-Asn(Mbh)-Tyr(Bu$^t$)-OH were dissolved in a mixture of 400 ml of glacial acetic acid and 400 ml of methanol and the solution was catalytically hydrogenated and worked up as sub (b). For purification, the substance was boiled once with water, suction-filtered and dried. By boiling it with ethyl acetate, the substance could be further purified. Yield: 53.4 g (84%), m.p. 221°–223°C, $[\alpha]_D = +33.3°$ ($c = 1$, in glacial acetic acid).

EXAMPLE 7

Synthesis of Z-Gln-Gly-Leu-Val-NH$_2$ (sequence of secretin)

a. Z-Leu-Val-NH$_2$ 8.91 g of 1-hydroxy-benzotriazole, 8.6 ml of N-ethyl-morpholine and 30.8 g (60 mmols) of Z-Leu-OPcp were added to a solution of 13 g of HBr.H-Val-NH$_2$ (66 mmols) in 180 ml of dimethylformamide. The mixture was stirred for 10 minutes at room temperature and then concentrated under greatly reduced pressure. The residue was successively stirred with 2N sodium carbonate solution, water, 2.5% KHSO$_4$-solution and water, the precipitate was suction-filtered and dried at 50°C over $P_2O_5$.

Yield: 21.3 g (98%).

The same result was obtained using
a. 3-hydroxy-4-oxo-3,4-dihydro-quinazoline,
b. 1-hydroxy-5,6-dimethyl-benzotriazole or
c. 1-hydroxy-pyridone, instead of 1-hydroxy-benzotriazole used above.

b. HCl.H-Leu-Val-NH$_2$

Pd(OH)$_2$/BaSO$_4$-catalyst was added to a suspension of 21 g (57.8 mmols) of Z-Leu-Val-NH$_2$ in a mixture of 200 ml of dimethylformamide and 200 ml of methanol. While stirring, hydrogen was passed through this reaction mixture while a pH-value of 5 was maintained by adding dropwise a 1N methanolic HCl-solution by means of an autotitrator. After no more HCl-solution was absorbed, the catalyst was suction-filtered and the filtrate was concentrated. The residue was triturated with ether, suction-filtered and dried at 50°C. Yield: 15.4 g (100%), m.p. 138°–140°C. The product was homogenous according to the thin-layer chromatogram.

c. Z-Gly-Leu-Val-NH$_2$ 15.4 g (57.8 mmols) of HCl.H-Leu-Val-NH$_2$, 7.52 ml of N-ethyl-morpholine and 7.88 g of 1-hydroxy-benzotriazole were dissolved in 120 ml of dimethylformamide. 22.5 g of Z-Gly-OTcp were added, the mixture was allowed to stand for 5 minutes and then concentrated under greatly reduced pressure. The residue was triturated with 2N sodium carbonate solution, suction-filtered and thoroughly washed with water. The substance was dried over $P_2O_5$ and boiled with ethyl acetate. For purification, the product could be dissolved and precipitated from tetrahydrofuran/petroleum ether. Yield: 21.8 g (90%), m.p. 184°–186°C, $[\alpha]_D = -12.8°$ ($c = 1$, in dimethylacetamide).

d. HCl.H-Gly-Leu-Val-NH$_2$ 20.0 g. (47.6 mmols) of Z-Gly-Leu-Val-NH$_2$ were catalytically hydrogenated as sub (b) in 200 ml of a mixture of methanol and dimethylformamide (1:1), and the product obtained was worked up as sub (b). The substance was slightly hygroscopic and was dissolved and precipitated from methanol/ether for purification. It was dried over $P_2O_5$ and paraffin scales.

Yield: 13.5 g (88%), m.p. 209°–211°C.

e. Z-Gln-Gly-Leu-Val-NH$_2$ 4 g (10 mmols) of Z-Gln-ONp were added to a solution of 3.23 g (10 mmols) of HCl.H-Gly-Leu-Val-NH$_2$, 1.3 ml of N-ethyl-morpholine and 1.35 g (10 mmols) of 1-hydroxy-benzotriazole in 20 ml of dimethylformamide and the mixture was allowed to stand for 10 minutes. A jelly-like substance precipitated. It was diluted with ether and the precipitated substance was suction-filtered. The precipitate was dried for a short time and stirred with 2N sodium carbonate solution. It was washed with water, KHSO$_4$-solution and water, dried over $P_2O_5$ and boiled with ethyl acetate. It was allowed to cool to room temperature, suction-filtered and washed with ethyl acetate and petroleum ether. The product was dried at 40°–50°C over $P_2O_5$ and paraffin scales. Yield: 5 g (91%), m.p. 242–244°C. $[\alpha]_D^{22} = -25.2°$ (c = 1, in glacial acetic acid).

The same result was obtained using
a. 3-hydroxy-4-oxo-3,4-dihydro-quinazoline,
b. 1-hydroxy-5,6-dimethyl-benzotriazole or
1-hydroxy-pyridone, instead of 1-hydroxy-benzotriazole used above.

EXAMPLE 8

Synthesis of Z-Pro-Ile-Gly-NH$_2$ a. Z-Ile-Gly-NH$_2$ 44.4 g (0.1 mol) of Z-Ile-OTcp and 11 g (0.1 mole) of HCl.H-Gly-NH$_2$ as well as 1.6 g (10 mmols) of 3-hydroxy-4-oxo-3,4-dihydroquinazoline and 130 ml of N-ethyl-morpholine were dissolved in 700 – 800 ml of dimethylformamide. The solution was then concentrated under greatly reduced pressure and the residue was triturated with a sodium bicarbonate solution, the precipitate was suction-filtered, washed with water, dried, dissolved in dimethylformamide and precipitated with a mixture of ether/petroleum ether (1:1) for further purification. Yield: 28.5 g, m.p. 202°C, $[\alpha]_D = +8.1°$ ($c = 1$, in dimethylacetamide).

| Analysis: | $C_{16}H_{23}N_3O_4$ | (molecular weight: 321.4) | | |
|---|---|---|---|---|
| | calculated: | C 59.80% | H 7.21% | N 13.08% |
| | found: | 59.6 % | 7 12.8% | 2% | b. Z-Pro-Ile-Gly-NH$_2$

A small amount of Pd(OH)$_2$/BaSO$_4$-catalyst was added to a solution of 20 g (62.2 mmols) of Z-Ile-Gly-NH$_2$ in 600 ml of methanol/dimethylformamide (3:1). While stirring, hydrogen was passed through this reaction mixture and the pH-value was maintained at 4.5 by adding dropwise 1N methanolic HCl-solution by means of an autotitrator. After no more HCl-solution was absorbed, the catalyst was suction-filtered and the filtrate was concentrated. The residue was dissolved in 100 ml of dimethylformamide. 23 g (62 mmols) of Z-Pro-ONp, 8.1 ml of N-ethyl-morpholine and 1.5 g (9.4 mmols) of 3-hydroxy-4-oxo-3,4-dihydroquinazoline were added. The mixture was stirred for 15 minutes and then concentrated under greatly reduced pressure. The residue was dissolved in ethyl acetate and cooled. A precipitate separated, it was suction-filtered and successively triturated with a sodium bicarbonate solution, 2N HCl and water. It was then dried and carefully triturated with ethyl acetate for further purification. The precipitate was suction-filtered and dried. Yield: 20.7 g (80%), m.p. 182°–184°C; $[\alpha]_D = -63.2°$ ($c = 1$, in methanol).

The same result was obtained using
a. 1-hydroxy-4-methyl-2-pyridone,
b. 1-hydroxy-6-methoxy-benzotriazole or
c. 1-hydroxy-5-methyl-benzotriazole, instead of the quinazoline derivative used above.

EXAMPLE 9

Synthesis of Z-Asp(Bu$^t$)-Phe-Val-Gln-Trp-Leu-Ile-Asn-Thr-(Bu$^t$)-OBu$^t$

I. Preparation of the Starting substance CH$_3$COOH.H-Phe-Val-Gln-Trp-Leu-Ile-Asn-Thr(Bu$^t$)-OBu$^t$ a. Z-Asn-Thr(Bu$^t$)-OBu$^t$ 42.85 g (161 mmols) of Z-Asn-OH, 43 g (161 mmols) of oily HCl-H-Thr(Bu$^t$)-OBu$^t$ (Obtained by catalytic hydrogenation of Z-Thr(Bu$^t$)-OBu$^t$ with an addition of methanolic HCl at a pH of 4.5) and 21.75 g (161 mmols) of 1-hydroxy-benzotriazole were dissolved in 325 ml of dimethylformamide. 21 ml of N-ethylmorpholine were added and a cold solution of 35.45 g of dicyclohexyl-carbodiimide in 80 ml of dimethylformamide was added at 0°C. The mixture was stirred for 1 hour at 0°C and for another hour at room temperature, the precipitate was suction-filtered and the filtrate was concentrated under greatly reduced pressure. The residue was distributed between ethyl acetate and NaHCO$_3$-solution. The organic phase was shaken with 2.5% KHSO$_4$-solution, saturated NAHCO$_3$-solution and water, dried with sodium sulfate and concentrated. The substance was triturated with petroleum ether and suction-filtered, Yield: 65.8 g, m.p. 110°–115°C. Recrystallization from ethyl acetate/petroleum ether. Yield: 52.4 g (68%), m.p. 120–122°C, $[\alpha]_D^{20} = 7.6°$ ($c = 1$, in methanol).

b. HCl.H-Asn-Thr(Bu$^t$)-OBu$^t$

A small amount of Pd(OH)$_2$/BaSO$_4$-catalyst was added to a solution of 44.7 g (93.2 mmols) of Z-Asn-Thr(Bu$^t$)-OBu$^t$ in 300 ml of methanol. While stirring, hydrogen was passed through this reaction mixture and the pH-value was maintained at 4.5 by adding dropwise 1N methanolic HCl by means of an autotitrator. After no more HCl-solution was absorbed, the catalyst was suction-filtered and the filtrate was concentrated. The residue was dissolved in ether, a small amount of insoluble material was filtered off and the substance was placed in a refrigerator overnight. Then the precipitate which had separated was suction-filtered and washed with ether. Yield: 33.65 g (95.6%), m.p. 110°–113°C, $[\alpha]_D^{20} = 2.6°$ ($c = 1$, in methanol).

| Analysis: | C$_{16}$H$_{32}$N$_3$O$_5$Cl | molecular weight: 382 | |
|---|---|---|---|
| calculated: | C 50.32% | H 8.45% | N 11.01% |
| found: | 50.0 % | 9.0 % | 10.9 % | c. Z-Ile-Asn-Thr(Bu$^t$)-OBu$^t$

A cold solution of 18.1 g of dicyclohexyl-carbodiimide in 70 ml of dimethylformamide was added at 0°C to a solution of 21.8 g (82 mmols) of Z-Ile-OH, 31.3 g (82 mmols) of HCl.H-Asn-Thr(Bu$^t$)-OBu$^t$, 11.1 g of 1-hydroxy-benzotriazole and 10.7 ml of N-ethyl-morpholine in 150 ml of dimethylformamide. The mixture was stirred for 1 hour at 0°C and for another hour at room temperature. The precipitate was suction-filtered and the filtrate was concentrated. The residue was worked up as sub (a). The resulting product was dissolved in 150 ml of ethyl acetate, insoluble material was separated by filtration and the residue was stirred into 750 ml of petroleum ether. Yield: 42.37 g (87%), m.p. 144°–146°C, $[\alpha]_D^{20} = -20.5°$ ($c = 1$, in methanol).

| Analysis: | C$_{30}$H$_{48}$N$_4$O$_8$ | molecular weight: 592.75 | |
|---|---|---|---|
| calculated: | C 60.82% | H 8.15% | N 9.46% |
| found: | 60.9 % | 8.4 % | 9.2 % | d. HCl.H-Ile-Asn-Thr(Bu$^t$)-OBu$^t$ 38.6 g (65.2 mmols) of Z-Ile-Asn-Thr(Bu$^t$)-OBu$^t$ were catalytically hydrogenated in methanol as disclosed sub (b). The substance was soluble in ether and provided an amorphous product under greatly reduced pressure. Yield: 33.2 g (100%), $[\alpha]_D^{30} = +5.9°$ ($c = 1$, in methanol).

| Analysis: | C$_{22}$H$_{43}$ClN$_4$O$_6$ | molecular weight: 495.07 | |
|---|---|---|---|
| calculated: | C 53.37% | H 8.76% | N 11.31% |
| found: | 53.0 % | 9.0 % | 10.9 % | e. Z-Leu-Ile-Asn-Thr(Bu$^t$)-OBu$^t$

A cold solution of 13.6 g of dicyclohexyl-carbodiimide in 60 ml of dimethylformamide was added at 0°C to a solution of 16.4 g (61.8 mmols) of Z-Leu-OH, 30.6 g (61.8 mmols) of HCl.H-Ile-Asn-Thr(Bu$^t$)-OBu$^t$, 8.34 g of 1-hydroxy-benzotriazole and 8.1 ml of N-ethyl-morpholine in 150 ml of dimethylformamide. The mixture was stirred for 1 hour at 0°C and for another hour at room temperature and the product was worked up as disclosed sub (a). The substance was triturated with petroleum ether and suction-filtered. Yield: 39.3 g, m.p. 173°–176°C. The substance was dissolved and precipitated from ethyl acetate/petroleum ether. Yield 37.5 g (86%), m.p. 173°–176°C, $[\alpha]_D^{30} = -34.3°$ ($c = 1$, in methanol).

| Analysis: | C$_{36}$H$_{58}$N$_5$O$_9$ | molecular weight: 705.9 | |
|---|---|---|---|
| calculated: | C 61.26% | H 8.42% | N 9.92% |
| found: | 61.4 % | 8.7 % | 9.9 % | f. HCl.H-Leu-Ile-Asn-Thr(Bu$^t$)-OBu$^t$ 35.2 g (50 mmols) of Z-Leu-Ile-Asn-Thr(Bu$^t$)-OBu$^t$ were catalytically hydrogenated in methanol according to (b). The substance crystallized upon trituration with ether. Yield: 28.5 g (94%), m.p. 192–193°C with decomposition, $[\alpha]_D^{30} = -17.9°$ (c = 1, in methanol).

Analysis: $C_{28}H_{54}ClN_5O_7$ molecular weight: 608.2
calculated:  C 55.26%   H 8.96%   N 11.51%
found:       55.3 %    9.0 %    11.4 % g. Z-Trp-Leu-Ile-Asn-Thr(Bu$^t$)-OBu$^t$

A cold solution of 9.5 of dicyclohexyl-carbodiimide in 60 ml of dimethylformamide was added at 0°C to a solution of 26.2 g (43.1 mmols) of HCl.H-Leu-Ile-Asn-Thr(Bu$^t$)-OBu$^t$, 14.6 g (43.1 mmols) of Z-Trp-OH, 5.82 g of 1-hydroxy-benzotriazole and 5.6 ml of N-ethyl-morpholine in 150 ml of dimethylformamide. The mixture was stirred for 1 hour at 0°C and for another hour at room temperature, the precipitate was suction-filtered and the filtrate was concentrated. The residue was triturated with NaHCO$_3$-solution and the precipitate was suction-filtered and dried. Recyrstallization from isopropanol. Yield: 33.8 g (88%), m.p. 228°–229°C, $[\alpha]_D^{30} = -39.5°$ (c = 1, in methanol)

Analysis: $C_{47}H_{69}N_7O_{10}$ molecular weight: 892.1
calculated:  C 63.28%   H 7.79%   N 10.99%
found:       63.0 %    7.8 %    10.7% h. HCl.H-Trp-Leu-Ile-Asn-Thr(Bu$^t$)-OBu$^t$ 31.2 g (35 mmols) of Z-Trp-Leu-Ile-Asn-Thr(Bu$^t$)-OBu$^t$ were catalytically hydrogenated in 200 ml of dimethylformamide/methanol (1:1) according to (b). The residue was triturated with ether. Yield: 27.2 g (98%), m.p. 215°C with decomposition. $[\alpha]_D^{30} = -28.0°$ (c = 1, in methanol).

A sample was dissolved and precipitated from methanol/ether: m.p. 217°C with decomposition, $[\alpha]_D^{30} = -28.4°$ (c=1, methanol)

Analysis: $C_{39}H_{64}N_7O_8Cl$ molecular weight: 794.45
calculated:  C 58.97%   H 8.12%   N 12.34%
found:       57.2 %    8.2 %    11.8 % i. Z-Phe-Val-OH 10.7 g of Z-Phe-Val-OMe were dissolved in 200 ml of dioxan/water (8 : 2). Titration is made against thymolphthalein using a total amount of 27 ml of 1N NaOH. The solution was neutralized with 2N HCl and concentrated. The residue was distributed between ethyl acetate and 2N HCl. The ethyl acetate phase was washed with water, dried with sodium sulfate and concentrated. The residue was triturated with ether and suction-filtered.

Yield: 9.45 g (92%), M.p. 148°–149°C. The substance was dissolved and precipitated from ethyl acetate:petroleum ether; yield 9.2 g, m.p. 148°–150°C, $[\alpha]_D^{20} = -8.8°$ (c=1, in methanol).

Analysis: $C_{22}H_{26}N_2O_5$ molecular weight: 398.5
calculated:  C 66.32%   H 6.58%   N 7.02%
found:       66.6 %    6.7 %    7.2 % k. Z-Phe-Val-Gln-OBu$^t$

A cold solution of 4.2 g of dicyclohexyl-carbodiimide was added at 0°C to a solution of 8.0 g (20 mmols) of Z-Phe-Val-OH, 4.8 g of HCl.H-Gln-OBu$^t$, 2.7 g of 1-hydroxy-benzotriazole and 2.6 ml of N-ethyl-morpholine in 40 ml of dimethylformamide. The mixture was stirred for 1 hour at 0°C and for another hour at room temperature, the precipitate was suction-filtered and the filtrate was concentrated. The residue was triturated with NaHCO$_3$-solution, suction-filtered and washed with water. Yield: 11.65 g (100%), m.p. 219°–221°C with decomposition, $[\alpha]_D^{20} = -35.7°$ (c= 1, in methanol)

Analysis: $C_{31}H_{42}N_4O_7$ molecular weight: 582.7
calculated:  C 63.91%   H 7.27%   N 9.60%
found:       64.2 %    7.7 %    9.7 % l. Z-Phe-Val-Gln-OH 11.1 g (19 mmols) of Z-Phe-Val-Gln-OBu$^t$ were dissolved in 30 ml of trifluoroacetic acid. After 30 minutes at room temperature, the solution was concentrated and the residue was triturated with ether and suction-filtered. The product was boiled with ethyl acetate for further purification, petroleum ether was added, the precipitate was suction-filtered and dried. Yield: 8.45 g (85%) m.p. 225°–227°C, $[\alpha]_D^{25} = -10.7°$ (c =1, in dimethylacetamide).

Analysis: $C_{27}H_{34}N_4O_7$ molecular weight: 526.6
calculated:  C 61.59%   H 6.51%   N 10.64%
found:       61.6 %    6.7 %    10.4 % m. Z-Phe-Val-Gln-Trp-Leu-Ile-Asn-Thr(Bu$^t$)-OBu$^t$ 1.3 ml of N-ethyl-morpholine, 1.35 g of 1-hydroxy-benzotriazole and, while stirring at 0°C, a cold solution of 2.2 g of dicyclohexyl carbodiimide in 20 ml of dimethylformamide were added to a solution of 7.95 g (10 mmols) of HCl.H-Trp-Leu-Ile-Asn-Thr(Bu$^t$)-OBu$^t$ and 5.27 g (10 mmols) of Z-Phe-Val-Gln-OH in 100 ml of dimethylformamide. The mixture was stirred for 1 hour at 0°C and for another hour at room temperature. The precipitate was suction-filtered and the filtrate was concentrated. The residue was triturated with NaHCO$_3$-solution and suction-filtered. The filter residue was boiled with 1 l of ethanol. 5.6 g of a sparingly soluble residue were obtained, m.p. 253°–255°C with decomposition, $[\alpha]_D^{30} = -15.3°$ (c = 1, in dimethylacetamide). Another 2.8 g crystallized from alcohol, m.p. 251°–254°C with decomposition. Total yield: 8.4 g (66.5%).

Analysis: $C_{66}H_{95}N_{11}O_{14}$ molecular weight: 1266.6
calculated:  C 62.6%   H 7.56%   N 12.16%
found:       62.2%    7.9 %    11.9 % n. CH$_3$COOH.H.H-Phe-Val-Gln-Trp-Leu-Ile-Asn-Thr(Bu$^t$)-OBu$^t$

Hydrogen was passed through a solution of 7.6 g (6 mmols) of Z-Phe-Val-Gln-Trp-Leu-Ile-Asn-Thr(Bu$^t$)-OBu$^t$) in 250 ml of glacial acetic acid, to which a small amount of Pd(OH)$_2$/BaSO$_4$-catalyst had been added, until no more carbon dioxide developed. The catalyst was suction-filtered, the filtrate was concentrated and the residue was triturated with ether. Yield: 7.4 g, m.p. 247°–250°C with decomposition. The product was boiled with ethyl acetate and suction-filtered when cold. Yield: 6.78 g (95%), m.p. 248°–251°C with decomposition.

II. Z-Asp(OBu$^t$)-Phe-Val-Gln-Trp-Leu-Ile-Asn-Thr(Bu$^t$)-OBu$^t$ 0.86 g (5.3 mmols) of 3-hydroxy-4-oxo-3,4-dihydroquinazoline and 2.66 g (5.3 mmols) of Z-Asp(OBu$^t$)-OTcp were added to a suspension of 6.32 g (5.3 mmols) of CH$_3$COOH.H-Phe-Val-Gln-Trp-Leu-Ile-Asn-Thr(Bu$^t$)-OBu$^t$ in 150 ml of dimethylformamide. After having been stirred for 5 minutes, the solution was concentrated and the residue was triturated with 2N sodium carbonate solution. The precipitate was suction-filtered and washed with water. The filter residue was boiled with methanol. A sparingly soluble residue was obtained: 5.3 g, m.p. 246°–248°C with decomposition; 0.5 g was obtained from the filtrate, m.p. 244°–246°C with decomposition; $[\alpha]_D^{25} = -15.0°$ ($c = 1$, in dimethylacetamide).

Total yeild: 5.8 g (76.4%)

Analysis: C$_{74}$H$_{108}$N$_{12}$O$_{17}$ molecular weight: 1437.7
calculated: C 61.8% H 7.57% N 11.69%
found: 61.1% 7.6 % 11.7 %

The same result was obtained using
a. 1-hydroxy-4-methyl-2-pyridone,
b. 1-hydroxy-6-methoxy-benzotriazole or
c. 1-hydroxy-5-methyl-benzotriazole, instead of the quinazoline derivative mentioned above.

EXAMPLE 10

Synthesis of Z-Phe-Val-OMe 2 g of Z-phenyl-alanine-poly-4-hydroxy-3-nitrostyrene resin containing 3 mmols of Z-phenyl-alanine and prepared according to J. Am. Chem. Soc. 90, 2953 (1966), were suspended in 5 ml of dimethylformamide and 162 mg (1 mmol) of 3-hydroxy-4-oxo-3,4-dihydroquinazoline, 168 mg (1 mmol) of HCl.H-Val-OMe and 0.13 ml of N-ethyl-morpholine were added. The mixture was stirred for 15 minutes, the precipitate was suction-filtered, washed with dimethylformamide, the filtrate was concentrated and the residue was distributed between ethyl acetate and sodium bicarbonate solution. The ethyl acetate phase was washed with 2N HCl, sodium bicarbonate solution and water, dried with sodium sulfate and concentrated. The residue was triturated with petroleum ether. The precipitate was suction-filtered and dried. Yield: 390 mg (95%), m.p. 115°C.

EXAMPLE 11:

Z-Tyr-Pro-insulin$_S$-(31-63)-triaconta-tripeptide 40 mg (10 μmols) of triaconta-tripeptide trifluoroacetate prepared according to Z.Naturforsch. 24 b, 999 (1969) were reacted in 1.8 ml of 90% dimethylformamide with 26 mg (60 mmols) of Z-Tyr-ONp in the presence of 1.35 mg (10 μmols) of 1-hydroxy-benzotriazole. After 15 minutes, the mixture was precipitated with ether and the precipitate was suction-filtered. After a washing operation with ether and methylene chloride, 36 mg of a reaction product were obtained. According to the amino acid analysis, the tyrosine content was 1.1 (calculated : 1).

R$_f$:0.72 in a mixture of n-butanol/pyridine/acetic acid/water (30:6:20:24), paper chromatography, ascending. R$_f$ of the triaconta-peptide: 0.22.

EXAMPLE 12

N$^{(B1)}$-(Boc-Leu-Phe)-N$^{(A1)}$,N$^{(B29)}$-bis-Boc-insulin 16.7 mg (30 μmols) of Boc-Leu-Phe-OTcp and 2.7 mg (20 μmols) of 1-hydroxy-benzotriazole were added in 2 ml of dimethylformamide to 120 mg of Boc$_2$-insulin (20 μmols), prepared according to Hoppe-Seyler's Z.physiol. Chem. 352 7, (1971). The mixture was stirred for 10 minutes at room temperature, precipitated with ether. The precipitate was suction-filtered and washed with ether.

Yield: 117 mg.

Amino acid analysis:
| | Leu | Phe |
|---|---|---|
| calculated: | 7 | 4 |
| found: | 6.98 | 3.96 |

Migration distance covered in paper electrophoresis at pH 2.2: 0.76 × insulin (Boc$_2$-insulin: 0.84 × insulin).

After the protective groups had been split off by a treatment with trifluoracetic acid for 1 hour and precipitation with ether, the compound covered the same distance in the paper electrophoresis as insulin does. The reaction period was 3 hours without an addition of 1-hydroxy-benzotriazole and partly brought about cross-linking.

The same result was obtained using
a. 1-hydroxy-4-methyl-2-pyridone
b. 1-hydroxy-6-methoxy-benzotriazole or
c. 1-hydroxy-5-methyl-benzotriazole, instead of 1-hydroxybenzotriazole used above.

EXAMPLE 13

Boc-βAla-Tyr-Ser-Met-Glu(OBu$^t$)-His-Phe-Arg-Trp-Cly-OH.4H$_2$O 5.36 g (4 mmols) of H-Tyr-Ser-Met-Glu(OBu$^t$)-His-Phe-Arg-Trp-Gly-OH.4H$_2$O, prepared according to Liebig's Ann. Chem. 726, 183 (1969), were reacted in 50 ml of dimethylformamide with 1.84 g (5 mmols) of Boc-β-Ala-OTcp in the presence of 540 mg (4 mmols) of 1-hydroxy-benzotriazole. After 15 minutes, 5.65 g (94%) of almost chromatographically pure reaction product were precipitated with ethyl acetate/ether (1:1) and recrystallized from 200 ml of 60% methanol for complete purification. Yield: 4.92 g (81%). The compound is identical with that obtained according to the above-mentioned art without 1-hydroxy-benzotriazole, but the reaction period was reduced from 20 hours 15 to

EXAMPLE 14:

N$^{(\alpha\ 1)}$, $\epsilon^{15}$, $\epsilon^{26}$, $\epsilon^{41}$, $\epsilon^{46)}$-penta-(Leu-Phe)-trypsin-kallikrein inhibitor 90 mg of trypsin-kallikrein inhibitor from cattle's organs [cf. Hoppe-Seyler's Z. physiol. Chem. 350, 1531 (1969)] were suspended in 2 ml of dimethylformamide. 56 mg of Boc-Leu-Phe-OTcp and 13 mg of 1-hydroxy-benzotriazole were added. Then water was added while stirring (a total of 0.51 ml), until the whole was dissolved. The solution was stirred for 15 minutes, concentrated under greatly reduced pressure, and the residue was triturated with absolute tetrahydrofuran. The precipitate was suction-filtered and dried. Yield: 110 mg.

95.7 mg of the substance were dissolved in 2 ml of trifluoracetic acid. The solution was allowed to stand for 30 minutes at room temperature, concentrated and the residue was distributed between water and ether, the aqueous phase was stirred with "Amberlite IR 45" (acetate form) and lyophilized.

Yield: 86 mg.
Amino acid analysis:  Leu  calculated: 7  found: 7.3
                     Phe  calculated: 9  found: 9.2

EXAMPLE 15

Synthesis of H-Gly-Ile-Val-Glu-Gln-OH (insulin A 1-5)

I. Preparation according to the solid-phase peptide synthesis method using 3-hydroxy-4-oxo-3,4-dihydroquinazoline a. Nps-Gln(Mbh)-polymer compound A solution of 12.3 g of Nps-Gln(Mbh)-OH and 3.2 ml of triethyl-amine in 60 ml of dimethylformamide was added to 20 g of a polystyrene resin which had been chloromethylated according to Merrifield, Biochemistry 3, 1358 (1964) and cross-linked with 2% of divinylbenzene, its chlorine content being 1.15 milliequivalents per gram. The mixture was shaken for 48 hours at 80°C, the precipitate was suction-filtered and the resin was washed several times with dimethylformamide, ethanol and methanol. After drying it in vacuo at 80°C over $P_2O_5$, the yield was 19.3 g. The amino acid content of the acylamino acid - synthetic resin compound was 1.15 mmols per gram.

Boc-Gly-Ile-Val-Glu(OBzl)-Gln(Mbh)-polymer compound 6 g of Nps-Gln(Mbh)-synthetic resin compound were subjected to the following reaction cycle in a reactor provided with a glass frit according to the Merrifield method (as above): $b_1$: Washing 3 times with 50 ml portions of glacial acetic acid.

- $b_2$: Splitting off the N-protective groups by shaking for half an hour with 1N solution of anhydrous HCl in glacial acetic acid, filtering.
- $b_3$: Washing with glacial acetic acid as disclosed sub $b_1$.
- $b_4$: Washing three times with 50 ml portions of ethanol.
- $b_5$: Washing three times with 50 ml portions of dimethylformamide.
- $b_6$: Neutralizing the hydrochloride grouping linked to the released β-amino groups of the resin by shaking for 10 minutes with 50 ml of a 10% solution of triethylamine in dimethylformamide.
- $b_7$: Washing again with dimethylformamide as disclosed sub $b_5$.
- $b_8$: Adding a dimethylformamide solution of 3.6 mmols of the corresponding Boc-amino acid-trichlorophenyl ester in 40 ml of dimethylformamide and 0.57 g (3.6 mmols) of 3-hydroxy-4-oxo-3,4-dihydroquinazoline and then shaking for 2 hours, finally filtering.
- $b_9$: Washing with dimethylformamide as disclosed sub $b_5$.
- $b_{10}$: Washing with absolute ethanol as disclosed sub $b_4$.

Each of the afore-mentioned washing operations took 3 minutes.

Subsequently, the solvent was removed by pressure filtration (pressurized air: 0.3 atmospheres gauge) through the glass frit of the reactor.

For linking an amino acid to the chain, the above-mentioned cycle $b_1$ to $b_{10}$ was carried out once. For this, the following Boc-amino-acid-2,4,5-trichlorophenyl esters were used successively in step $b_8$ of the disclosed cycle: Boc-Glu(OBzl)-OTcp, Boc-Val-OTcp, Boc-Ile-OTcp and Boc-Gly-OTcp.

After drying over $P_2O_5$ at 80°C under greatly reduced pressure, the yield of Boc-Gly-Ile-Val-Glu(OBzl)-Gln(Mbh)-polymer compound was 5.3 g, the peptide content being 8.2% (determined by acid hydrolysis and quantitive determination of amino acids).

c. Release of the peptide 3 g of the acyl-peptide-polymer compound prepared according to (b) were suspended in the above-mentioned reactor in 20 ml of anhydrous trifluoroacetic acid. Subsequently, a slow stream of anhydrous hydrobromic acid was passed, within 90 minutes, with the exclusion of moisture, from below through the glass frit of the reactor and through the suspension lying above. The suspension was then filtered and the resin was washed 3 times with 10 ml portions of trifluoroacetic acid. The combined trifluoroacetic acid filtrates and washing solutions were concentrated in vacuo. The residue was digested twice while decanting with 50 ml portions of absolute ether. After drying under greatly reduced pressure over $P_2O_5$, the yield was 396 mg, m.p.: decomposition beginning at 225°C, $[\alpha]_D^{22} = -51.4°$ (c = 0.25, in water). 114 mg of a colorless amorphous substance were obtained from 200 mg of this crude product by distribution chromotography on Sephadex LH 20 in a solvent system of butanol/acetic acid/water (2:1:10). M.p. 240°C with decomposition. $[\alpha]_D^{22} = -71.4°$ (c = 0.25, in water). Amino acid analysis: see Table 4.

II. Preparation according to the solid-phase peptide synthesis method without using 3-hydroxy-4-oxo-3,4-dihydroquinazoline.

In this comparative test, the whole method of preparation was qualitatively and quantitatively identical with that disclosed sub I without, however, using 3-hydroxy-4-oxo-3,4-dihydroquinazoline according to step $b_8$. In detail, the results of the comparative test were the following: Yield of crude substance: 420 mg, m.p. decomposition beginning at 96°C, $[\alpha]_D^{22} = -27°$ (c = 0.25, in water). By distribution chromatography on Sephadex LH 20, only 84 mg of a product having the following physical data were obtained from 206 mg of crude product: M.p. decomposition beginning at 165°C, $[\alpha]_D^{22} -34.9°$ (c = 0.25, in water). It was not homogenous according to thin-layer chromatography. Amino acid analysis: see Table 4.

III. Preparation according to conventional methods a. Boc-Gly-Ile-OH.CHA 26 ml of N-ethyl-morpholine and at 0°C a solution of 44 g of dicyclohexyl-carbodiimide in 50 ml of ice-cold dimethyl-formamide were added to a solution of 35 g (0.2 mol) of Boc-Gly-OH, 38.4 g (0.2 mol) of HCl.H-Ile-OMe and 27 g (0.2 mol) of 1-hydroxy-benzotriazole in 350 ml of dimethylformamide. The mixture was stirred for 1 hour at 0°C and for another hour at room temperature, the precipitate was suction-filtered and the filtrate was concentrated. The residue was distributed between ethyl acetate and sodium bicarbonate solution. The ethyl acetate phase was shaken with KHSO$_4$-solution, NaHCO$_3$-solution and water, dried with sodium sulfate and concentrated. Yield:61.1 g in the form of oil. The oil was dissolved in ethyl acetate and chromatographed by means of a column packed with 185 g of basic Al$_2$O$_3$ (Woelm, activity stage I). The ethyl acetate eluate was concentrated. Yield: 55.8 g.

The above-mentioned oil was dissolved in 250 ml of a mixture of dioxan and water (8:2) and a small amount of thymolphthalein was added. Titration was then effected with a 1N sodium hydroxide solution until the solution kept a blue color for a certain period of time. Consumption: 179 ml of 1N NaOH. The solution was then neutralized with KHSO$_4$-solution and the reaction mixture was concentrated. The residue was dissolved in water. The solution was covered with ethyl acetate and, while cooling with ice, it was acidified with 2N H$_2$SO$_4$ to reach a pH-value of 2–3 and thoroughly stirred. The ethyl acetate phase was separated, washed once with water, dried over sodium sulfate and concentrated. The residue was dissolved in ether, and cyclohexylamine was added until a basic reaction took place. The reaction mixture was placed in ice, the precipitate was suction-filtered, washed with ether and dried. Yield: 55.6 g (71.8%), m.p. 198°–200°C.

For further purification, the substance was dissolved in 100 ml of methanol and the solution was stirred into 1.5ml of ether and cooled. After 1 hour, the precipitate was suction-filtered. Yield: 45.5 g (59%), m.p. 204°–205°C, $[\alpha]_D^{22} = +17.4°$ (c = 1, in methanol).

b. Z-Val-Glu(OBu$^t$)-Gln(Mbh)-OH 65.2 g (81 mmols) of Z-Val-Glu(OBu$^t$)-Gln(Mbh)-OMe prepared according to Chem. Ber. 103, 2038 (1970), were suspended in about 400 ml of dioxan/water (8:2) and titrated with 1N NaOH against thymolphthalein as an indicator. After the solution had kept its blue color for a certain time, it was acidified with KHSO$_4$-solution and the precipitate was suction-filtered. The filter material was boiled with acetone, the precipitate was suction-filtered, dissolved and precipitated from dimethylformamide/water.

Yield: 59 g (92%), m.p. 216–218°C.
Analysis: C$_{42}$H$_{54}$N$_4$O$_{11}$   molecular weight: 790.9
calculated:   C 63.72%   H 6.85%   N 7.05%
found:   63.3 %   7.1 %   8.1 % c. H-Val-Glu(OBu$^t$)-Gln(Mbh)-OH

Hydrogen was passed through a suspension of 52 g (65.7 mmols) of Z-Val-Glu(OBu$^t$)-Gln(Mbh)-OH and a small amount of Pd(OH)$_2$/BaSO$_4$-catalyst in 500 ml of glacial acetic acid until no more CO$_2$ escaped. The catalyst was then suction-filtered and the filtrate was concentrated. The residue was triturated with ether and suction-filtered. The precipitate was stirred for about 5 hours with a saturated sodium acetate solution, suction-filtered and dried. The substance was finally boiled with methanol. Yield: 27 g (62.6%), m.p. 226–228°C, $[\alpha]_D^{22} = +9.0°$ (c = 1, in glacial acetic acid).

Analysis: C$_{34}$H$_{48}$N$_4$O$_9$   molecular weight: 656.8
calculated:   C 62.20%   H 7.35%   N 8.53%
found:   61.4 %   7.3 %   8.5 % d. Boc-Gly-Ile-Val-Glu(OBu$^t$)-Gln(Mbh)-OH 7.8 g (20 mmols) of Boc-Gly-Ile-OH.CHA were stirred at 0°C between 100 ml of ether and 40 ml of 2N citric acid. The ether phase was separated, washed with water, dried with sodium sulfate and concentrated. Yield: 4.6 g of oil.

2.09 g of 3-hydroxy-4-oxo-3,4-dihydro-1,2,3-benzotriazine and, at 0°C, 2.76 g of dicyclohexylcarbodiimide were added to a solution of 3.9 g of the oily substance obtained (BocGly-Ile-OH) in 35 ml of dimethylacetamide. The mixture was stirred for 1 hour at 0°C and for another hour at room temperature. The precipitate which had separated was suctionfiltered and washed with a small amount of dimethylacetamide. 5.85 g of finely ground H-Val-Glu(OBu$^t$)-Gln(Mbh)-OH were added to the filtrate and the mixture was stirred for 5 hours at room temperature. A thick precipitate separated. It was allowed to stand overnight and then the substance was completely precipitated with 300 ml of water. The precipitated substance was suction-filtered, washed with water and boiled with 200 ml of ethanol. The solution was cooled to room temperature and the precipitate was suction-filtered and carefully washed with alcohol. Yield: 6.7 g (81.3%), m.p. 253–255°C, $[\alpha]_D^{22} = -2.1°$ (c = 1, in dimethylacetamide).

Analysis: C$_{47}$H$_{70}$N$_6$O$_{13}$   molecular weight: 927.1
calculated:   C 60.90%   H 7.61%   N 9.07%
found:   61.0 %   7.6 %   9.2 % e. H-Gly-Ile-Val-Glu-Gln-OH 200 mg of Boc-Gly-Ile-Val-Glu(OBu$^t$)-Mbh-OH and 9.5 ml of anisole were dissolved in 5 ml of trifluoracetic acid and the solution was refluxed for 10 minutes. It was then concentrated and the residue was triturated with ether. The precipitate was then suction-filtered and dissolved in water. the aqueous solution was stirred with "Amberlite IR 45" (acetate form) until a pH of 3 –4 was reached. The exchanger was suction-filtered and the filtrate was clarified with charcoal. The clear aqueous solution was freeze-dried. Yield: 50 mg $[\alpha]_D^{22} = -75°$ (c=0.25, in water). Substance was homogenous according to thin-layer chromatogram. Amino acid analysis: see Table 4.

TABLE 4

Comparison of the amino acid analyses and physical data of the H-Gly-Ile-Val-Glu-Gln-OH prepared according to methods I, II and III.

|  | according to I (solid-state method using 3-hydroxy-4-oxo-3,4-dihydro-quinazoline) | according to II (solid-state method as in I, but without a catalyst) | according to III (conventional method) |
|---|---|---|---|
| $[\alpha]_D^{22}$ (c=0.25, water) | −71.5° | −39.4° | −75.0° |
| decomposition point | from 240°C | from 165°C | from 255°C |
| thin-layer chromatogram | homogenous and identical with III | 3 spots, one thereof identical with III | homogenous |
| Amino acid analysis (72 hours at 110°C) | Glu 2.6<br>Gly 1.0<br>Val 0.9<br>Ile 0.87 | Glu 2.74<br>Gly 1.0<br>Val 0.445<br>Ile 0.33 | Glu 2.2<br>Gly 1.0<br>Val 0.9<br>Ile 0.9 |

The results exhibited in Table 4 clearly demonstrate the superiority of the process according to the invention even in the solid-state method. According to the conventional method using trichlorophenyl esters without the addition of the catalysts of the invention, it has not been possible to obtain a material which is even only approximately as homogenous as that obtained by this invention.

Preparation of some catalysts 3-hydroxy-4-methyl-2,3-dihydro-thiazole-2-thione a. 5-thioxo-6-oxa-4-thia-2-octanone A solution of 185 g (2 mols) of chloroacetone in 300 ml of methylene chloride was covered with 300 ml of water. At 10°–20°C, 320 g (2 mols) of $C_2H_5O$-CSSK were introduced portionwise while stirring. Stirring was continued for 2 hours at room temperature; the phases were separated, the organic phase was washed once more with 100 ml of water, dried with sodium sulfate and distilled. Boiling point 92°–99°C under pressure of 0.05 mm mercury. Yield: 305 grams.

b. 5-thioxo-6-oxa-4-thia-2-octanone oxime 65.6 g of sodium acetate and 137 g of the 5-thioxo-6-oxa-4-thia-2-octanone obtained according to (a) were added to a solution of 56.0 g of hydroxylamine hydrochloride in 400 ml of methanol. After stirring for 18 hours at room temperature, the solvent was eliminated in vacuo, the residue was combined with water, the mixture was extracted with methylene chloride, the organic phase was dried with sodium sulfate and freed from the solvent. The residue was dissolved in diisopropyl ether. By cooling, a total amount of 101 g of oxime, m.p. 64°C, could be obtained from this solution in several fractions.

c. 3-hydroxy-4-methyl-2,3-dihydro-thiazole-2-thione 125.3 g of a solution of the oxime obtained according to (b) in 300 ml of methylene chloride were added dropwise, within 15 minutes, while cooling and thoroughly stirring, to a solution of 104.4 g of NaOH in 200 ml of water. Stirring was continued for 5 minutes, 500 ml of water were added, the phases were separated, the aqueous phase was shaken twice with 100 ml portions of hexane and finally acidified with concentrated hydrochloric acid to reach a pH-value of 2. Stirring was continued for 1 hour in an ice bath, the precipitate was carefully suction-filtered and thoroughly washed twice with 300 ml of water each time. Yield: 61.5 g, m.p. 90°C. Another 12 g of the same product could be obtained by extraction of the aqueous solution with methylene chloride.

EXAMPLE 18

1-hydroxy-4,6-dimethyl-3,5-dichloro-2-pyridone 20 g of a 1-hydroxy-4,6-dimethyl-2-pyridone were dissolved in a mixture of 75 ml of concentrated hydrochloric acid and 60 ml of water and, at 10°–15°C, 21.6 g of chlorine were fed in. Stirring was continued for 1 hour. The precipitate was suction-filtered, washed with water and dried in vacuo. Yield: 22.9 g, m.p. 213°C. Recrystallization from acetonitrile increased the melting point to 216°C.

What is claimed is:

1. In a method for synthesizing a peptide which comprises reacting a protected amino acid or protected peptide of the formula

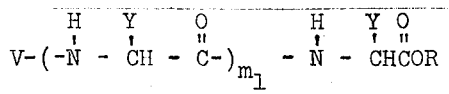

with a protected or unprotected amino acid or peptide of the formula

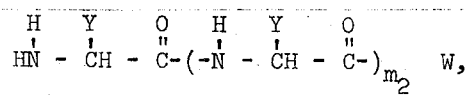

wherein V is an amino protective group or pyroglutamyl: Y is a protected or unprotected side chain of a natural or synthetic $\alpha$-or $\beta$-amino acid, or

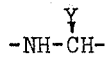

may be pyrrolidinyl; R is di-, tri-, tetra-, or pentachlorophenyl, nitrophenyl, or chloronitrophenyl; $m_1$ is zero or an integer from 1 to about 10; $m_2$ is zero or an integer from 1 to an order of magnitude of 500; and W is hydroxy, O-alkyl, O-aralkyl, amino-alkylamino, aralkylamino, or arylamino, or a polymeric carrier bonded by an ester or amide bond, the improvement wherein the reagents are reacted in a strongly polar solvent in the presence of a catalytic compound of the formula

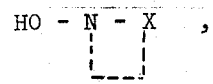

wherein X is C=O, C=S, or N= and X and N are members of a 5-or 6-membered substituted or unsubstituted heterocyclic ring, or of such a ring containing 1 or 2 additional hetero atoms, or of such rings fused with a substituted or unsubstituted benzene nucleus, said catalytic compound having a pK-value for the —N=OH group thereof which is between 3.7 and 4.2, and wherein the substituents on said substituted heterocyclic ring and on said substituted benzene nucleus are selected from the group consisting of lower alkyl, lower alkoxy, halo, perhalo lower alkyl and nitro.

2. A method as in claim 1 wherein said pK value is measured at 30°C. in a 0.5 molar solution in a 6:4 solvent mixture of diethylene glycol dimethyl ether and water.

* * * * *

UNITED STATES PATENT OFFICE
CERTIFICATE OF CORRECTION

Patent No. 3,872,074　　　　　　　　　Dated March 18, 1975

Inventor(s) Wolfgang Konig et al.

It is certified that error appears in the above-identified patent and that said Letters Patent are hereby corrected as shown below:

On the Cover Sheet, in item [73],

"Farbwerke Hoechst Aktiengesellschaft"

should read

-- Hoechst Aktiengesellschaft --

Signed and Sealed this sixteenth Day of September 1975

[SEAL]

Attest:

RUTH C. MASON
*Attesting Officer*

C. MARSHALL DANN
*Commissioner of Patents and Trademarks*